March 25, 1958  R. I. MASON  2,828,475
REMOTE CONTROL OR MEASUREMENT INDICATING MEANS
Filed March 16, 1944
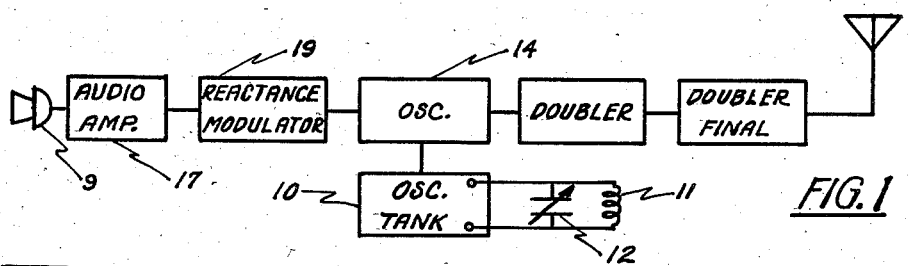
FIG. 1
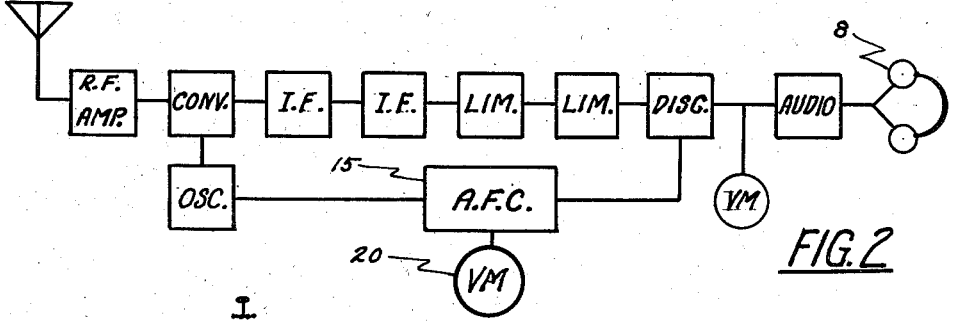
FIG. 2
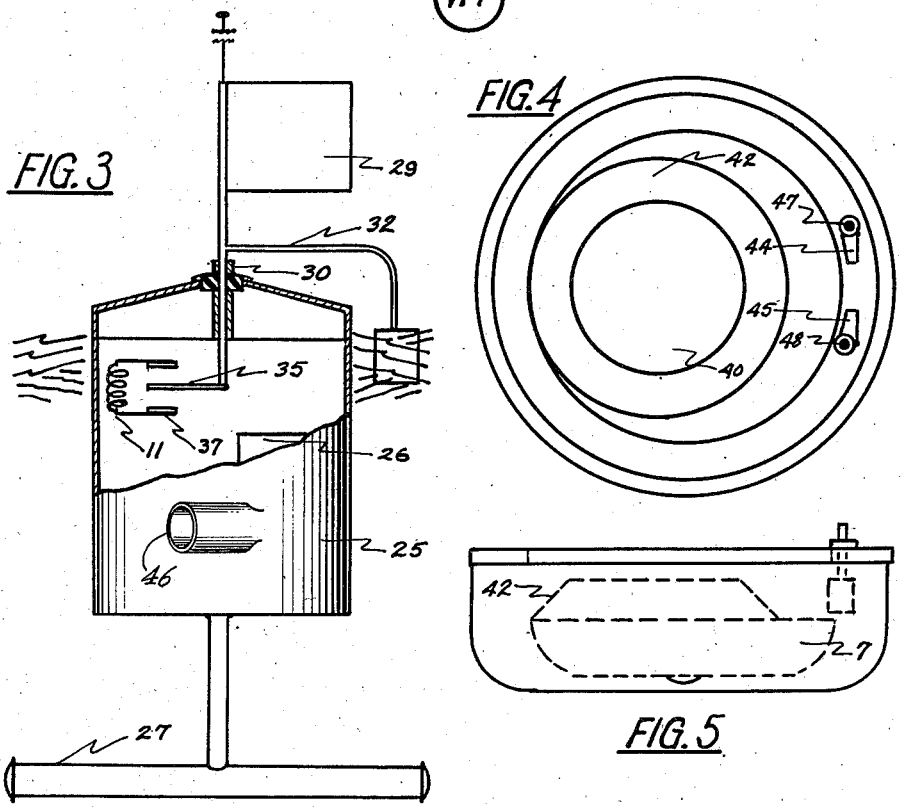
FIG. 3
FIG. 4
FIG. 5
INVENTOR
RUSSELL I. MASON
BY
ATTORNEY

United States Patent Office 2,828,475
Patented Mar. 25, 1958

2,828,475

REMOTE CONTROL OR MEASUREMENT INDICATING MEANS

Russell I. Mason, New London, Conn., assignor to the United States of America as represented by the Secretary of the Navy Application March 16, 1944, Serial No. 526,758

2 Claims. (Cl. 340—2)

The present invention relates in general to a method and apparatus for transmitting intelligence from a remote point to a receiver, more particularly it relates to the transmitting of a signal that is the indication of the directional position of an object in reference to the position of the transmitter located at a remote point from the receiver.

In the problem of locating vessels at sea it has been found that their noises transmitted through water may be picked up by a hydrophone and retransmitted by radio to a listener at a remote point. Essentially, the apparatus consists of a floating radio transmitter from which hangs a hydrophone, and said hydrophone acting as a transducer picks up sound waves traveling through the water from a sound source. The sound signals, upon conversion into radio signals, are transmitted to a listener to whom they are made available through a radio receiving set. A difficulty encountered in the use of devices of this character has been the uncertainty of the directional position of the sound source. Various methods of determining the location of an enemy submarine with respect to such a floating buoy have been tried and found subject to certain disadvantages.

It is an object of this invention to provide a buoy construction which will of itself indicate the direction from which the sound signals are being received by the hydrophone.

Another object of this invention is to provide a device using a rotatable element with a fixed reference point, preferably magnetic north as obtained from a compass, or a line of wind direction, in order that the listener may ascertain the direction from which the sound is coming.

Another object of this invention is to provide a frequency shift in the transmitted signal as the direction indicator.

Another object is the provision of a radio system which will be economical to manufacture, reliable in operation and which possesses all of the qualities of ruggedness and dependability in service.

Other objects and features will become apparent upon a careful consideration of the following detailed description when taken together with the accompanying drawings, the figures of which are designed for the sole purpose of illustration and not as a definition of the limits of the invention, reference for the latter purpose being had to the appended claims.

In the drawings:

Figure 1 is a block diagram of a transmitter circuit.

Figure 2 is a block diagram of a receiver circuit.

Figure 3 is a schematic view of the parts of this invention incorporated in a buoy.

Figure 4 illustrates a plan view of the details of a compass and condenser unit in which magnetic north is used as a reference point.

Figure 5 is an elevational view of Figure 4.

In general one form of this invention consists of a directional hydrophone, or other intelligence receiving device, mounted for rotation in a horizontal plane. To provide a reference point with respect to such rotation, a magnetic compass plate is provided which, subject to inconsequential variations, will always point toward magnetic north. A condenser construction consisting of a fixed and a rotating member is supplied, the one plate 42 of Figure 4 is integral with the compass plate 7 and the other plates 47 and 48 are carried by the rotating hydrophone structure. The condenser is so constructed that its capacity is different for each horizontal position which the hydrophone will assume as it rotates about its axis.

In another form of this invention it has been found that the wind direction for a given time and location is relatively constant and at a particular time may be determined by a smoke flare dropped in to the water surface. In this form of the invention the direction of the wind rather than magnetic north is used as the reference point for determining the hydrophone position. The structure required for this form consits of one element of the frequency determining condenser which is held by a suitable vane 29 of Figure 3 fixed with respect to the wind direction; and the other elements of the condenser rotating with the hydrophone structure. These elements establish the capacity variation required. This condenser is connected into the oscillator circuit and it results in a mean carrier frequency of the transmitted signal which is dependent upon the azimuthal position of the hydrophone structure with respect to its reference point.

In order that the frequency variation of these signals may be continuous and slow, the hydrophone is slowly rotated with respect to the reference point to scan the horizon, and requires that a small driving force be supplied. One form of driving force may consist of a positive drive for the hydrophone by a small jet turbine 46, of Figure 3 in which a compressed gas rotates the hydrophone as it discharges through tangentially discharging orifices against the resistance of the atmosphere or the water. Another form of driving force may consist of a wind turbine chiefly used where there are regularly prevailing winds. It is apparent that any other means of driving the device may be used as long as a continuous and relatively slow rate of rotation is maintained.

Referring now to Figures 1 and 2, there are shown block diagrams of a transmitting and a receiving circuit, which are used as part of this invention. The frequency modulating transmitter of Figure 1 possesses a center frequency controlled by the oscillator tank circuit indicated at 10 and including the coil 11 and condenser 12. Any change in the impedance of this circuit, either in the capacitance or inductance thereof, changes the mean frequency of the oscillator 14. As previously mentioned, the frequency variation with respect to azimuth is very slow.

The sonic energy received by the directional hydrophone 9 is impressed on the audio amplifier 17, and the amplified sonic signal is used to control the operation of the reactance tube 19, which provides a frequency modulated signal of the sonic energy which is transmitted.

It will be apparent that the mean carrier frequency of the transmitter of Fig. 1 at any particular instant corresponds to a determinable direction, since it is correlated to a reference plane. Sonic energy received by the hydrophone is therefore transmitted at a mean frequency indicative of its direction from the hydrophone 9. The frequency variations in the mean frequency of the transmitter are of such a low order of frequency with respect to the frequency of the sonic energy that separation of the two at the receiver is easily accomplished.

The receiver illustrated in Fig. 2 is similar to a conventional frequency modulated receiver of the superhetrodyne type, and employs a broad-band intermediate amplifier followed by a limiter to produce a constant amplitude signal. This constant amplitude signal is impressed on a discriminator of conventional type to produce a direct current signal proportional in magnitude to the deviation of the signal from the resonant frequency of the discriminator. The polarity of the direct current signal reverses with the sense of the frequency deviation. The direct current signal is integrated over a time interval to provide an accurate measure of the means frequency of the signal impressed on the discriminator.

The oscillator of the receiver is provided with an automatic frequency control circuit, which comprises a reaction tube connected thereto, which serves to maintain the intermediate frequency of the receiver within the handpass of the intermediate amplifiers. The compensation of the intermediate frequency cannot become perfect, so that the direct current signal remains an accurate measure of frequency variations at all times. Such a circuit is illustrated in Patent No. 2,316,317 to Curtis, issued April 13, 1943, entitled Frequency Responsive Network.

Voltmeter 20 is connected to receive the direct current signal, and so indicates frequency variations in the received signal from its mean or reference frequency. The voltmeter 20 may be directly calibrated in azimuth relative to the reference of the buoy.

Audio frequency components in the output of the discriminator are impressed on the audio amplifier and the headset 8. The operator at the receiver may therefore hear the noises received by the hydrophone 9 and determine its direction from the hydrophone 9 by noting the indication of voltmeter 20 at the time the noise is heard.

The result achieved by the foregoing circuits is to provide transmission which simultaneously accomplishes two results. In the first place, the desired signal itself, as from the hydrophone, is transmitted to the receiver. At the same time a significant fact concerning that signal is transmitted to the receiver, i. e., the direction from which the sound comes as indicated by the aforementioned impedance change in the tank circuit of Figure 1. Other examples of dual intelligence may be transmitted with this system, the present example forming only one illustration.

In the preferred construction such impedance change is accomplished by a capacity, as contrasted with inductance shift in the transmitting circuit, which may be effected as indicated above in one of two ways: by varying the capacity with respect to magnetic north or by varying the capacity with respect to the wind direction which would be known to the operator of the receiver.

Referring first to the wind direction modification of this invention, attention is directed to Figure 3. In this figure is shown a buoy 25 forming the transmitter part of the system previously mentioned. Such a buoy consists of a cylindrical case in which is contained a transmitter 26 whose block diagram is shown in Figure 1, batteries and other incidental equipment. Suspended from the buoy is a directional hydrophone 27. A wind vane antenna 29 is supported by the buoy and mounted for relative rotation with respect to the buoy by means of a leakproof bushing type bearing 30.

In the particular construction described, the antenna is provided with a vane and a damping mechanism 32 which includes a paddle lying beneath the surface of the water. The result is to damp out any tendency of the antenna to shift due to sudden gusts of wind, with the result that the antenna is held substantially constant with respect to the average wind direction.

In the magnetic compass modification of the invention there is provided a similar condenser embodied in the construction shown in Figures 4 and 5. This consists of a floating magnetic element 40 carrying an eccentric condenser plate 42. The compass 7 is so mounted in the buoy that its axis of rotation and the elements of the condenser correspond in general position to that of the wind vane antenna type construction of Figure 3. Two fixed plates, 44 and 45, are provided lying alongside of the condenser plate 42 and connected to leads 47 and 48. In use, the plate 42 will be maintained in such position that the compass magnets will always register with magnetic north, thus for practical purposes holding the plate 42 stationary. As the buoy rotates about its vertical axis, the plates 44 and 45 rotate to effect the capacity variation by which the particular directional position of the hydrophone may be indicated by the voltmeter 20, in Figure 2.

In operation, the buoy 25 is placed in the water at a desired location with the transmitter and rotating mechanism in operation. The operator then listens at the receiver located at a remote location, and, when he receives noises, notes the direction of those noises from the buoy 25. Obviously, several buoys may be employed at spaced points to allow triangulation on the noise source, if desired.

Numerous other means may be employed to rotate the buoy with respect to the fixed condenser plates 35 or 42, as the case may be. This may be accomplished by a small gas turbine, utilized to rotate the buoy about its vertical axis. Another may be a clock spring motor operating conventional paddle wheels to provide the afore-mentioned rotation. It will be apparent that various means may be used to impart the desired rotation.

I claim:

1. In a radio system consisting of multiplex transmitting and receiving apparatus for two channels of intelligence, means for shifting the frequency of the carrier wave by changing the capacitance of the oscillator tank circuit in accordance with the intelligence of one channel, means for modulating the carrier wave in accordance with intelligence of the second channel, means for automatically tuning the receiver to the shifting carrier wave frequency, indicating means in the automatic tuning control circuit of the receiver, said indicating means being responsive to the shifting carrier wave to indicate the intelligence of the first channel, and means also in the receiver for reproducing the modulated intelligence of the second channel.

2. In combination, a sonic buoy, means for continuously rotating the buoy, a transmitter and antenna forming a portion of said buoy, a variable capacitor in the tank circuit of the oscillator of said transmitter, means for holding one set of plates of the variable capacitor stationary as the other set rotates with the buoy, the resulting change of capacitance continuously shifting the carrier frequency of the transmitter as the buoy rotates, a compressional wave responsive means integral with said buoy and rotating therewith, means for modulating the carrier wave in response to receipt of the compressional waves, a receiver having an automatic frequency control circuit to hold the receiver tuned to the shifting carrier frequency, voltage responsive means in the automatic frequency control circuit for indicating the rotation of the buoy, and means for demodulating the compressional waves whereby a reading of the voltage responsive means at the instant compressional waves are received indicates the direction of the source of said waves with respect to the buoy.

References Cited in the file of this patent

UNITED STATES PATENTS

| | | |
|---|---|---|
| 1,454,532 | Beatty | May 8, 1923 |
| 1,528,032 | Staege | Mar. 3, 1925 |
| 1,551,707 | Sprague | Sept. 1, 1925 |

(Other references on following page)

UNITED STATES PATENTS

| | | |
|---|---|---|
| 1,571,006 | Hartley | Jan. 26, 1926 |
| 1,592,940 | Kendall | July 20, 1926 |
| 1,718,497 | St. Clair | June 25, 1929 |
| 1,732,741 | Conrad | Oct. 22, 1929 |
| 1,913,512 | Reynolds | June 13, 1933 |
| 1,928,969 | Kuffel | Oct. 3, 1933 |
| 2,089,987 | Urfer | Aug. 17, 1937 |
| 2,103,847 | Hansell | Dec. 28, 1937 |
| 2,151,747 | Conrad | Mar. 28, 1939 |
| 2,177,493 | Koulichkov | Oct. 24, 1939 |
| 2,316,317 | Curtis | Apr. 13, 1943 |
| 2,334,704 | Hilferty | Nov. 23, 1943 |
| 2,357,975 | Roberts | Sept. 12, 1944 |
| 2,361,177 | Chilowsky | Oct. 24, 1944 |
| 2,448,787 | Ferrel | Sept. 7, 1948 |

FOREIGN PATENTS

| | | |
|---|---|---|
| 335,125 | Italy | Feb. 1, 1936 |
| 596,439 | Germany | May 3, 1934 |
| 787,315 | France | July 1, 1935 |